United States Patent Office 2,816,772
Patented Dec. 17, 1957

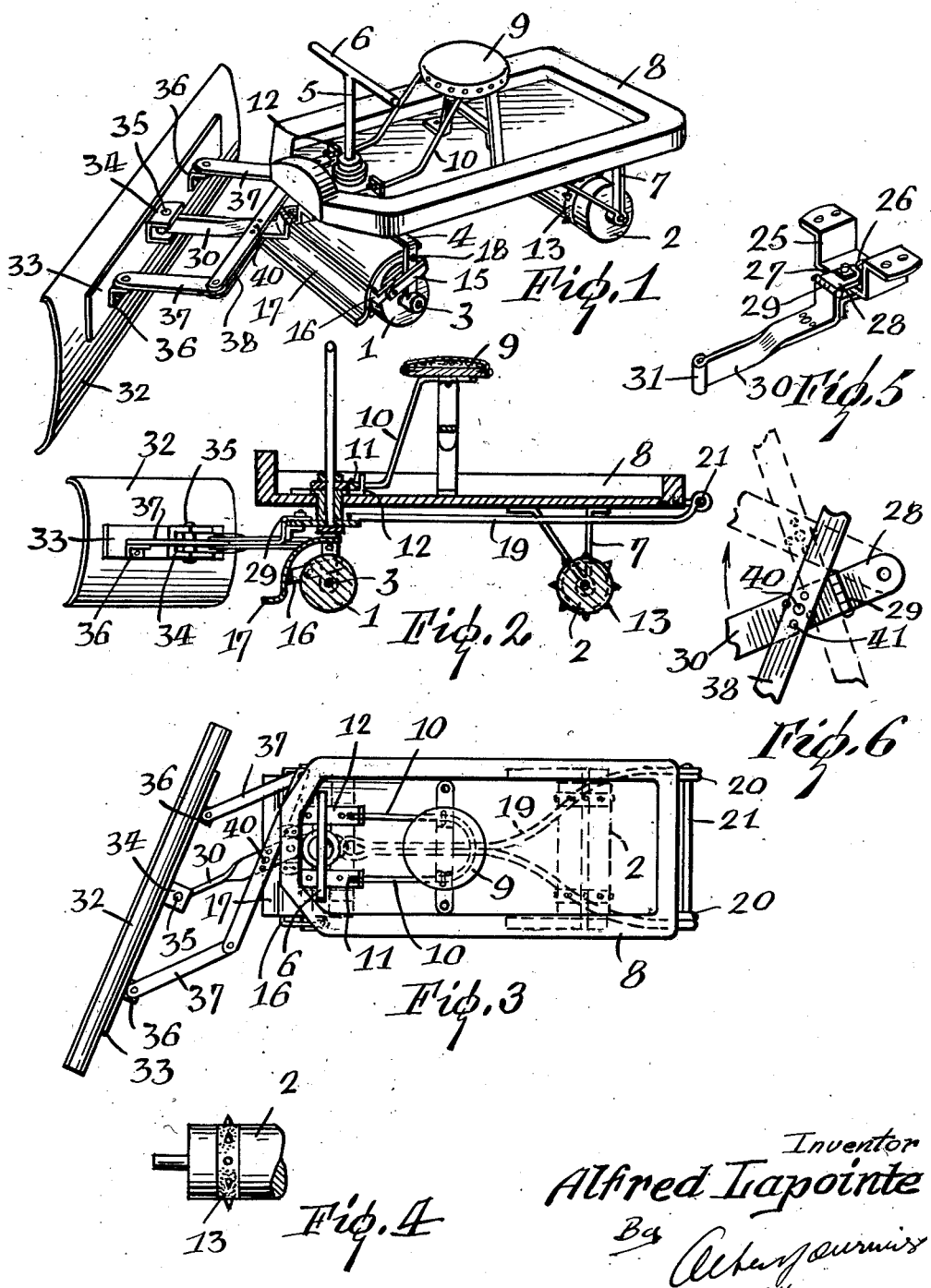

2,816,772

CHILD'S WAGON WITH OBSTACLE CLEARING GUARD

Alfred Lapointe, Montreal, Quebec, Canada

Application June 7, 1955, Serial No. 513,837

1 Claim. (Cl. 280—87.01)

The present invention pertains to a novel child's vehicle designed for general utilitarian purposes.

One of the objects of the invention is to provide such a vehicle that can be used either on the ground or on snow or ice. Another object is to provide such a vehicle that rides on rollers rather than wheels, and in this connection a cleaning guard foot for the said roller is also provided.

Still another object is to provide sturdy and comfortable seating and steering means. A still further object is to provide a plow attachable to the forward end of the vehicle when desired. Related thereto is an adjusting mechanism for securing the plow in one or another of opposite angles, removing the snow to one side or the other of the path.

The invention is fully disclosed by way of example in the following description and in the accompanying drawings in which:

Figure 1 is a perspective view of the device;
Figure 2 is a longitudinal section;
Figure 3 is a plan view;
Figure 4 is a detail;
Figure 5 is a detail perspective view; and
Figure 6 is a detail plan view.

Reference to these views will now be made by use of like characters which are employed to designate corresponding parts throughout.

In Figure 1 are shown ground rollers 1 and 2, with an axle 3 in the roller 1. A steering yoke 4 receives the ends of the axle 3 and has a vertical stem 5 carrying a stool handle 6. The ends of the roller 2 are similarly received in the bearing 7 secured to the bottom of a wagon platform 8 which rests unsecured on the yoke 4. A seat 9 is mounted on the platform and has forwardly extending and bent rods 10 with angled ends 11 passed through brackets 12 secured on the platform. The roller 2 may carry spiked bands 13 if desired.

On the sides of the yoke 4 are mounted friction clips 15 carrying a cross bar 16 to which is secured a guard 17 overlying the roller 1. The sides of the yoke are apertured at 18 to receive a draw bar 19 (Figure 3) which, when not in use, is slung under the vehicle and fastened to the ends 20 of a rod 21 at the rear of the platform. Guard 17 is used close to the ground in order to clear the path of stones or similar obstructions in front of roller 1.

Beneath the forward end of the platform is secured a clip 25 having an aperture 26 in which pass stem 5. A bolt 27 secures a board member 28 to the clip, and an arm 30 extends from a hinge 29 forward from this member. The forward end of the arm is formed with a vertical knuckle 31.

A plow 32 has a backing plate 33 with a central bracket 34 attached to the knuckle 31 by a pin 35. Lateral brackets 36 on the plate 33 are joined by links 37 to a double cross bar 38 which traverses on the arm 30 and is secured thereto by a pin 40.

The arm 30 and bar 38 are formed with apertures 41 at opposite sides of the pivot 40.

As shown in Figure 6, the plow and linkage may be swung so that one or another pair of apertures 41 in the members 30 and 38 are in coincidence, wherein they may be secured by a suitable locking pin to maintain the desired position.

Although a specific embodiment of the invention has been illustrated and described, it will be understood that various alterations in the details of construction will be made without departing from the scope of the invention as indicated by the appended claim.

What I claim is:

In a vehicle, forward and rear ground rollers, a bearing receiving the ends of the rear roller, a steering yoke receiving the ends of the forward roller, a platform fixed to said bearing, and resting on said yoke, a steering column fixed to said yoke and passing through said platform, friction clips on the sides of said yoke, a cross bar secured to said clips, and a guard secured to said bar and overlying the ground in front of said roller.

References Cited in the file of this patent

UNITED STATES PATENTS

| 110,523 | Whitcomb | Dec. 27, 1870 |
| 571,665 | Herron | Nov. 17, 1896 |
| 828,748 | Klingberg | Aug. 14, 1906 |
| 941,170 | Roberts | Nov. 23, 1909 |
| 1,277,623 | Matthews | Sept. 3, 1918 |
| 2,115,609 | Bregman | Apr. 26, 1938 |
| 2,127,104 | Bucklin | Aug. 16, 1938 |
| 2,266,625 | Cundiff | Dec. 16, 1941 |
| 2,345,460 | Coderre | Mar. 28, 1944 |
| 2,386,025 | Wills | Oct. 2, 1945 |

FOREIGN PATENTS

| 102,779 | Switzerland | Dec. 17, 1923 |